US009617365B2

(12) United States Patent
Moravek et al.

(10) Patent No.: US 9,617,365 B2
(45) Date of Patent: Apr. 11, 2017

(54) CATALYTIC COMPOSITIONS AND THIOLENE-BASED COMPOSITIONS WITH EXTENDED POT LIFE

(71) Applicant: PPG INDUSTRIES OHIO, INC., Cleveland, OH (US)

(72) Inventors: Scott J. Moravek, Mars, PA (US); Steven Bowles, Pittsburgh, PA (US); Davina Schwartzmiller, Rural Valley, PA (US); Adam Bradley Powell, Wexford, PA (US); Kurt G. Olson, Gibsonia, PA (US); Maurizio Ballarino, Limbiate (IT); Matteo Bertoli, Casnate con Bernate (IT); Stefano Gianellini, Origgio (IT); Terri Ziegler, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/945,492

(22) Filed: Nov. 19, 2015

(65) Prior Publication Data
US 2016/0264697 A1 Sep. 15, 2016

Related U.S. Application Data

(63) Continuation-in-part of application No. 14/645,450, filed on Mar. 12, 2015.

(51) Int. Cl.
| *C08L 35/02* | (2006.01) |
| *C09D 175/14* | (2006.01) |
| *C08K 5/37* | (2006.01) |
| *C08G 75/00* | (2006.01) |
| *C08F 122/10* | (2006.01) |
| *C08G 75/045* | (2016.01) |

(52) U.S. Cl.
CPC ........ *C08F 122/105* (2013.01); *C08G 75/045* (2013.01); *C08K 5/37* (2013.01); *C08L 35/02* (2013.01); *C09D 175/14* (2013.01)

(58) Field of Classification Search
CPC .. C08F 112/105; C08F 122/105; C08L 35/02; C09D 175/14; C08K 5/37; C08G 75/045

USPC ........................................................ 524/556
See application file for complete search history.

(56) References Cited

U.S. PATENT DOCUMENTS

| 3,898,349 | A | | 8/1975 | Kehr et al. |
| 3,908,039 | A | | 9/1975 | Guthrie et al. |
| 4,076,917 | A | | 2/1978 | Swift et al. |
| 4,097,298 | A | | 6/1978 | Haeufler et al. |
| 4,374,235 | A | | 2/1983 | Culbertson et al. |
| 4,425,472 | A | | 1/1984 | Howard et al. |
| 4,698,385 | A | | 10/1987 | Schindler |
| 4,767,804 | A | | 8/1988 | Willoughby |
| 4,908,397 | A | | 3/1990 | Barsotti et al. |
| 5,236,967 | A | * | 8/1993 | Ohkawa .............. C08F 299/022 522/100 |
| 5,976,422 | A | * | 11/1999 | Okoroafor ............... G02B 5/23 252/183.11 |
| 6,639,046 | B1 | | 10/2003 | Van Dijk |
| 2005/0027082 | A1 | | 2/2005 | Narayan-Sarathy et al. |
| 2009/0047442 | A1 | * | 2/2009 | Bowman .................. C09D 4/00 427/487 |
| 2009/0047531 | A1 | * | 2/2009 | Bartley .................... C09D 4/00 428/515 |

FOREIGN PATENT DOCUMENTS

| CA | 2371636 A1 | 10/2001 |
| EP | 0810251 A2 | 12/1997 |
| GB | 1469935 | 4/1977 |
| JP | H59415 A | 1/1993 |
| JP | H9255741 A | 9/1997 |
| WO | 2008/003498 A1 | 1/2008 |

* cited by examiner

*Primary Examiner* — Michael M Bernshteyn
(74) *Attorney, Agent, or Firm* — Krisanne Shideler

(57) ABSTRACT

The present invention is directed to catalytic compositions and to curable compositions containing them. Catalytic compositions of the present invention typically comprise: (i) a reactive compound comprising at least one group selected from acid-functional groups and/or groups that may be converted to acid-functional groups; (ii) a metal compound; and (iii) a compound different from (i) and (ii) that catalyzes an addition reaction between an ethylenically unsaturated compound and a thiol. Curable compositions according to the present invention comprise: (a) a polyene, (b) a polythiol, and (c) the afore-mentioned catalytic composition.

24 Claims, No Drawings

CATALYTIC COMPOSITIONS AND THIOLENE-BASED COMPOSITIONS WITH EXTENDED POT LIFE

CROSS-REFERENCE TO RELATED APPLICATIONS

This patent application is a Continuation-in-Part of U.S. patent application Ser. No. 14/645,450 filed Mar. 12, 2015, entitled: "THIOLENE-BASED COMPOSITIONS WITH EXTENDED POT LIFE", the entirety of which is incorporated herein by reference.

FIELD OF THE INVENTION

The present invention relates to catalytic compositions and to curable compositions with extended pot life, the curable compositions comprising a polyene, a polythiol, and the catalytic composition.

BACKGROUND OF THE INVENTION

Catalysis is an initiation or a change in the rate of a chemical reaction due to the participation of a material called a catalyst. Catalysts that speed the reaction are known as positive catalysts. Catalysts that slow the reaction are known as negative catalysts, or inhibitors. Unlike reactants, a catalyst is not consumed by the reaction itself.

A catalyst works by providing an alternative reaction mechanism pathway from the reactants to the reaction product. The rate of the reaction is increased when this alternative route has a lower activation energy than the reaction route not mediated by the catalyst. Catalysts can also enable reactions that would otherwise be blocked or slowed by a thermodynamic or kinetic barrier. The catalyst may increase a reaction rate or selectivity of the reactants, or enable the reaction to proceed at lower temperatures than would otherwise be possible. As such, catalysts can be very valuable tools in industrial chemical processes.

There can nevertheless be drawbacks to the use of catalysts. For example, tin compounds are used extensively in industrial products such as coatings as catalysts for isocyanate/hydroxyl reactions. Amine compounds are used as catalysts for polyene/thiol reactions. Unfortunately, the levels of these catalysts required to provide acceptably fast cure rates and final product properties often result in a short application time window after the reactants are mixed.

There is thus a need to work in a timely manner so that the mixed components maintain a low enough viscosity for application to a substrate, e.g. by spraying. The span of time during which the coating is ready to apply to a substrate and still of low enough viscosity to be applied is commonly referred to as "pot life."

Typically, pot life must be balanced with cure speed of the applied coating. For instance, in a multi-component coating system that uses a catalyst, the pot life and cure speed are primarily controlled by the amount of catalyst present. Accordingly, if a fast cure speed is required more catalyst can be used but that will also cause a shorter pot life. Conversely, if a longer pot-life is needed less catalyst can be used but the cure speed would also be retarded.

It is also important that the applied coating composition dry and harden quickly so that dirt pick-up is minimized and valuable shop space is not occupied with the coated substrate, such as an automobile, while it is drying. The length of time between when a coating is applied to a substrate and when the coating has dried or cured sufficiently that dust or other debris falling onto the coated substrate will not stick to the coated substrate is referred to as "dust-free time" or "tack-free time" and is an indicator of the speed of cure. One way to speed the drying and cure of the composition is to add additional catalyst, but this shortens the time available for processing, e.g. by spraying, since higher catalyst levels also cause the viscosity of the composition to increase more quickly as reaction rates increase.

Polyenes containing unsaturated groups, such as acryloyl groups, react with active hydrogen-containing compounds. Such a reaction is believed to involve an addition of an anion derived from the nucleophilic, active hydrogen-containing compound, acting as a donor, to an activated unsaturated group, which serves as an acceptor. When these active hydrogen-containing compounds are C—H compounds such as malonic ester or acetoacetate, the reaction is known as a Michael addition reaction. It is also known that SH-containing compounds may function as active hydrogen-containing compounds in a reaction mechanism which is similar to the Michael addition reaction. Such a reaction mechanism with SH-containing compounds is known as a thiolene reaction.

Catalysts for the thiolene reaction include quaternary ammonium compounds, tetramethyl guanidine, diaza-bicyclo-undecene, and diaza-bicyclo-nonene. Thiolene reactions catalyzed by these strong bases can be difficult to control and such reaction mixtures typically have a short pot life.

It would be desirable to catalyze chemical reactions between polyenes and thiols using catalysts that overcome these drawbacks of the prior art by lengthening the pot life of the composition and/or by accelerating the thiolene reaction rate after application without adversely affecting the pot life.

SUMMARY OF THE INVENTION

It has now surprisingly been found that these objectives can be achieved by the use of certain catalytic compositions. The catalytic compositions of the present invention comprise:

(i) a reactive compound comprising at least one group selected from acid-functional groups and/or groups that may be converted to acid-functional groups;

(ii) a metal compound; and (iii) a compound different from (i) and (ii) that catalyzes an addition reaction between an ethylenically unsaturated compound and a thiol.

The present invention also relates to curable compositions comprising:

(a) a polyene, (b) a polythiol, and (c) the catalytic composition according to the present invention.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer, oligomer, and prepolymer; i. e., a material that may be chain extended to increase its molecular weight.

Acrylic and methacrylic are designated herein in a summarizing manner as (meth)acrylic. Likewise, allyl and methallyl are designated herein in a summarizing manner as (meth)allyl.

Aliphatic and cycloaliphatic are designated herein in a summarizing manner as (cyclo)aliphatic.

The phrase "derived from a polyisocyanate", such as in the expression "A is derived from a polyisocyanate", refers herein to a moiety that results from the reaction of an isocyanate group —N=C=O of a polyisocyanate with a group reactive with an isocyanate group such as a hydroxyl group. Similarly, "derived from a polyol", such as in the expression "$R_1$ is derived from a polyol", refers to a moiety resulting from the reaction of an alcoholic hydroxyl group —OH of a polyol with a group reactive with a hydroxyl group such as an carboxyl group.

A "maleimide" refers herein to a compound having a maleimide group:

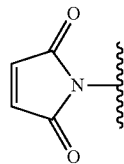

A bismaleimide refers to a compound having two maleimide groups, where the two maleimide groups are bonded by the nitrogen atoms via a linking atom or group.

By "ambient" is meant the condition of surroundings without adjustment of the temperature, humidity or pressure. Ambient temperature usually ranges from 40 to 95° F. (about 4 to 35° C.), often 60 to 95° F. (about 15 to 35° C.), such as a typical room temperature, 72° F. (22.2° C.).

Unless otherwise indicated, molecular weights are reported as number average molecular weights determined by gel permeation chromatography relative to polystyrene standards with the unit of g/mol.

As mentioned above, the catalytic compositions of the present invention comprise (i) a reactive compound; i. e., a compound that will participate as a reactant in a chemical reaction, comprising at least one group selected from acid-functional groups and/or groups that may be converted to acid-functional groups via an appropriate chemical reaction. Examples of such reactive compounds may include an anhydride, an acid (including, for example, carboxylic, phosphoric, or sulfonic acids), or a reaction product of an active hydrogen compound and an anhydride or polyacid. Mixtures of such reactive compounds having different free acid and/or the above-mentioned convertible groups may also be used.

The reactive compounds (i) useful in the catalytic compositions of the invention typically have molecular weights from 50 to 1,000,000. They may be low molecular weight monomeric compounds; for example, monomeric compounds such as anhydrides or acids with molecular weights in the range of 98 to 900, or polymeric compounds such as anhydride- and/or acid functional polymers having molecular weights up to 1,000,000 such as in the range from 1,000 to 1,000,000. Examples of suitable monomeric anhydrides include one or more of maleic anhydride, hexahydrophthalic anhydride, succinic anhydride, phthalic anhydride, tetrahydrophthalic anhydride, including alkyl-substituted anhydrides such as methyl hexahydrophthalic anhydride and methyl succinic anhydride.

According to the present invention the reactive compound (i) used in the catalytic composition can often comprise an anhydride-containing polymer. Examples of suitable anhydride-containing polymers are, for instance, anhydride-containing (meth)acrylic polymers such as (meth)acrylic polymers having at least two anhydride groups. Typically the anhydride-containing polymers such as anhydride-containing (meth)acrylic polymers have a molecular weight of 1,000 to 1,000,000.

An exemplary anhydride-containing (meth)acrylic polymer can be prepared by various means known to one skilled in the art such as conventional free-radical or controlled free-radical polymerization. For example, an anhydride-containing (meth)acrylic polymer can be prepared by conventional techniques in which the monomers, solvent, and conventional initiators such as t-butyl perbenzoate are charged into a polymerization vessel and heated to between 75° and 200° C. for about 0.5 to 6 hours to form the polymer.

An anhydride-containing (meth)acrylic polymer can be formed by copolymerizing monomers selected from alkyl methacrylates, alkyl acrylates or mixtures thereof, where the alkyl groups can have 1-12 carbon atoms, with ethylenically unsaturated anhydrides (or ethylenically unsaturated dicarboxylic acids which are converted to the acid anhydride during the polymerization).

Typical alkyl acrylates and methacrylates that can be used to form an anhydride-containing (meth)acrylic polymer may include methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other ethylenically unsaturated monomers, i.e. ethylenically unsaturated monomers different from alkyl(meth)acrylates and ethylenically unsaturated anhydrides (or ethylenically unsaturated dicarboxylic acids which are converted to the acid anhydride during the polymerization), such as styrene, 2-methyl styrene, (meth)acrylonitrile, (meth)acrylamide, (meth)acryloalkoxy silanes and (meth)acrylic acid may also be used. Mixtures of two or more of the above monomers are often used. The non-anhydride monomers are typically present in amounts of up to 99 percent by weight, such as 60 to 95 percent by weight, based on the total weight of the monomers used to prepare the polymer.

Ethylenically unsaturated anhydrides useful in the preparation of an anhydride-containing (meth)acrylic polymer include, for instance, itaconic anhydride, maleic anhydride, isobutenyl succinic anhydride and the like. Typically, the ethylenically unsaturated anhydride may be present in the reaction mixture used to prepare the (meth)acrylic polymer in amounts of at least 1 percent by weight, such as 5 to 40 percent by weight, based on total weight of monomers used to prepare the polymer.

Likewise, suitable acids for use as the reactive compound (i) according to the present invention include monomeric mono- and difunctional or other polyfunctional acids such as (meth)acrylic acid, fumaric acid, crotonic acid, acetic acid, propionic acid, other saturated monocarboxylic acids such as isostearic acid and aromatic unsaturated carboxylic acids, and acid-containing polymers. Examples of acid-containing polymers include polymers, e.g. (meth)acrylic polymers, having at least two acid groups. Typically the acid-containing polymers such as acid-containing (meth)acrylic polymers have a molecular weight of 1,000 to 1,000,000. Acid-containing (meth)acrylic polymers may be prepared in a manner similar to the anhydride containing (meth)acrylic polymers described above. Ethylenically unsaturated acid-functional monomers can be present in the reaction mixture used to prepare the (meth)acrylic polymer in amounts of at least 1 percent by weight, such as 5 to 40 percent by weight, based on the total weight of monomers used to prepare the polymer.

The reactive compound (i) present in the catalytic composition according to the present invention may also comprise a reaction product of an active hydrogen compound such as an alcohol or thiol and an anhydride; for example, monothioesters or monoesters of dicarboxylic acids such as monobutyl maleate and monobutyl itaconate, and monoamides of dicarboxylic acids.

The catalytic compositions of the present invention further comprise (ii) a metal compound. Suitable metal compounds include at least one of a metal oxide, a metal salt, including organic and inorganic salts, and an organometallic compound. Metals that may be present in the metal compound (ii) include, e.g., iron, tin, vanadium, cobalt, magnesium, manganese and mixtures thereof. The metal compound (ii) present in the curable composition according to the present invention may often comprise an iron compound. Exemplary metal compounds include e.g. iron (II) and iron (III) compounds such as iron oxides, ferrous or tulle acetate, and metal halides such as ferric chloride and ferrous chloride.

The catalytic compositions of the present invention also contain (iii) a compound different from (i) and (ii) that catalyzes an addition reaction between an ethylenically unsaturated compound and a thiol. Suitable catalytically active compounds (iii) include e.g. primary, secondary and tertiary amines and phosphines. Specific non-limiting examples of such compounds include for instance oxazolidines, triethylamine, dimethylhexylamine, dimethylcyclohexylamine, dimethyloctylamine, dimethyldodecylamine, dimethylamino alcohols such as dimethylamino ethanol, tetramethyl guanidine, diaza-bicyclo-octane, diaza-bicyclo-undecene, diaza-bicyclo-nonene, n-methyl-triaza-bicyclodecene, trioctyl phosphine and triphenyl phosphine.

The compound (iii) may also comprise a substituted carbonate salt. Lithium, sodium, potassium, quaternary ammonium, and phosphonium carbonates are suitable. Particular examples include tetrahexylammonium methylcarbonate, tetrahexylammonium bicarbonate, tetradecyl-trihexylammonium methylcarbonate, and tetradecylammonium methylcarbonate. Such substituted carbonate salts are disclosed in United States Patent Application Publication Number 2013/0210986 at paragraphs [0032] to [0039], incorporated herein by reference. Combinations of any of the mentioned compounds may also be used where suitable.

When the metal compound (ii) comprises an iron compound and the compound (iii) comprises a secondary or tertiary amine, the molar ratio of amine to iron is usually 0.4 to 500:1, such as 0.9 to 30:1, or 1:1 or 10:1 or 25:1 or 75:1.

The catalytic compositions of the present invention are useful to extend pot life and at the same time provide a rapid curing time for various curable compositions, in particular, compositions that undergo thiolene-type reactions. The catalytic compositions of the present invention are more effective at extending the pot life of compositions that undergo thiolene-type reactions than conventional catalysts. These curable compositions are often useful as automotive refinish coatings because they can be reactive at ambient temperatures. Catalyst compositions of the present invention can also be used to extend the pot life and provide a rapid curing time for thiolene reactions in aerospace coating and sealant systems based on thiolene curing chemistry. Coatings and sealants useful in aerospace applications must meet a number of demanding performance requirements including resistance to aviation fluids. Prepolymers having sulfur groups in the backbone such as polythioether, polysulfides, and sulfur-containing polyformals can be advantageously used in aerospace coatings and sealants. These sulfur-containing prepolymers can be reacted with a polyene in the presence of an amine catalyst to provide a cured coating or sealant suitable for aerospace applications. Compositions comprising thiol-terminated sulfur-containing prepolymers and polyenes such as acrylates are disclosed in U.S. Application Publication No. 2006/0270796, which is incorporated by reference in its entirety. Compositions comprising thiol-terminated sulfur-containing prepolymers are disclosed in U.S. Application Publication Nos. 2013/0343371, 2014/0378649, 2015/0119549, 2015/0252233, 2013/0345389, and 2015/0099858, and 2015/0252232, each of which is incorporated by reference in its entirety. Compositions comprising thiol-terminated sulfur-containing prepolymers suitable for use in aerospace sealant applications and thiolene curing chemistries are disclosed, for example, in U. Application Publication Nos. 2012/00401303 and 2014/0186543, each of which is incorporated by reference in its entirety.

The present invention thus also relates to curable compositions comprising:
(a) a polyene,
(b) a polythiol, and
(c) the catalytic composition of the present invention as described above.

Suitable polyenes (a) for use in the curable compositions of the present invention are numerous and can vary widely. Such polyenes can include those that are known in the art. Non-limiting examples of suitable polyenes can include those that are represented by the formula:

$$A\text{-}(X)_m$$

wherein A is an organic moiety, X is an olefinically unsaturated moiety, an alkynyl group, and/or a Michael acceptor group, and m is at least 2, typically 2 to 6. The organic moiety A can comprise C, H and heteroatoms. The organic moiety A can comprise can e.g. contain one or more group(s) selected from ester and urethane groups. The organic moiety A can, for example, be derived from a polyisocyanate such as set forth below for polyurethane (meth)acrylates and polyurethanes containing (meth)allyl groups. Non-limiting examples of X are groups of the following structures:

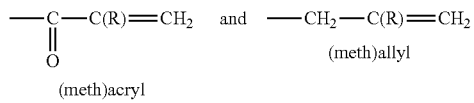

wherein each R is selected from H and a methyl group.

Suitable polyenes include compounds or polymers having in the molecule olefinic double bonds that are polymerizable such as by exposure to radiation. Examples of such materials are (meth)acrylic-functional (meth)acrylic copolymers, epoxy resin(meth)acrylates, polyester (meth)acrylates, polyether (meth)acrylates, polyurethane (meth)acrylates, amino(meth)acrylates, silicone (meth)acrylates, and melamine (meth)acrylates, of which polyester (meth)acrylates and polyurethane (meth)acrylates are particularly useful. The number average molecular weight ($M_n$) of these compounds is often around 200 to 10,000. Suitable polyenes typically contain on average 2 to 20 olefinic double bonds that are polymerizable e.g. by exposure to radiation per molecule. Aliphatic and/or cycloaliphatic (meth)acrylates are usually used, (Cyclo)aliphatic polyurethane (meth)acrylates and (cyclo)aliphatic polyester (meth)acrylates are particularly suitable. Combinations of a plurality of polyenes such as any of those mentioned herein may likewise be used as polyene (a) in the curable compositions according to the present invention.

As mentioned above, polyurethane (meth)acrylates are suitable for use as the polyene (a). Examples of polyurethane (meth)acrylates include reaction products of polyisocyanates such as 1,6-hexamethylene diisocyanate and/or isophorone diisocyanate including isocyanurate and biuret derivatives thereof with hydroxyalkyl(meth)acrylates such as hydroxyethyl(meth)acrylate and/or hydroxypropyl(meth)acrylate. The polyisocyanate can be reacted with the hydroxyalkyl(meth)acrylate in a 1:1 NCO/OH equivalent ratio or can be reacted with an NCO/OH equivalent ratio greater than 1:1 to form an NCO-functional reaction product that can then be chain extended with a polyol such as a diol or triol, for example 1,4-butane diol, 1,6-hexane diol and/or trimethylol propane.

Polyester (meth)acrylates are also suitable for use as the polyene (a), and include, for example, reaction products of (meth)acrylic acid or (meth)acrylic acid anhydride with polyols, such as dials, triols, tetraols and higher polyols, including alkylated polyols, such as propoxylated diols and triols. Examples of suitable polyols include glycerol, 1,4-butane diol, 1,6-hexane diol, neopentyl glycol, trimethylol propane, pentaerythritol and propoxylated 1,6-hexane did. Specific examples of suitable polyester (meth)acrylates are for instance glycerol tri(meth)acrylate, trimethylolpropane tri(meth)acrylate, pentaerythritol tri(meth)acrylate, pentaerythritol tetra(meth)acrylate, and dipentaerythritol penta(meth)acrylate.

(Meth)allyl compounds or polymers can also be used either alone or in combination with (meth)acrylate compounds such as those described above as the polyene (a) in the curable compositions according to the present invention. Examples of (meth)allyl materials are polyallyl ethers such as the diallyl ether of 1,4-butane diol and the triallyl ether of trimethylol propane. Examples of other (meth)allyl compounds are polyurethanes containing (meth)allyl groups, including reaction products of polyisocyanates such as 1,6-hexamethylene diisocyanate and/or isophorone diisocyanate (including isocyanurate and biuret derivatives thereof) with hydroxyl-functional allyl ethers, such as the monoallyl ether of 1,4-butane diol and the diallylether of trimethylol propane. The polyisocyanate can be reacted with the hydroxyl-functional allyl ether in a 1:1 NCO/OH equivalent ratio or can be reacted with an NCO/OH equivalent ratio greater than 1:1 to form an NCO-containing reaction product that can then be chain extended with a polyol such as a diol or triol, for example 1,4-butane diol, 1,6-hexane diol and/or trimethylol propane.

As mentioned above, the polyene (a) can also comprise one or more Michael acceptor groups. A "Michael acceptor group" refers to an alkenyl/alkynyl moiety in which one or more electron-withdrawing groups such as carbonyl (—C═O), nitro (—NO$_2$), nitrile (—CN), alkoxycarbonyl (—COOR), phosphonate (—PO(OR)$_2$), trifluoromethyl (—CF$_3$), sulfonyl (—SO$_2$—), p-toluenesulfonyl (—SO$_2$—C$_6$H$_4$—CH$_3$), etc., is directly bonded to a carbon atom of the carbon-carbon double or triple bond, respectively. Types of compounds that include a Michael acceptor group are e.g. vinyl ketones, quinones, nitroalkenes, acrylonitriles, acrylates, methacrylates, cyanoacrylates, acrylamides, maleimides, dialkyl vinylphosphonate, and vinylsulfones. Other examples of Michael acceptors are disclosed in Mather et al., *Prog. Polym. Sci.* 2006, 31, 487-531. Michael acceptor compounds having more than one Michael acceptor group are also well known. Examples include diacrylate s such as ethylene glycol diacrylate and diethylene glycol diacrylate, dimethacrylates such as ethylene glycol methacrylate and diethylene glycol methacrylate, bismaleimides such as N,N'-(1,3-phenylene)dimaleimide and 1,1'-(methylenedi-4,1-phenylene)bismaleimide, vinylsulfones such as divinyl sulfone and 1,3-bis(vinylsulfonyl)-2-propanol, etc. A Michael acceptor group, which may be present in the polyene (a) according to the present invention may for instance have the structure of Formula (1a) or Formula (1b):

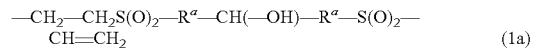

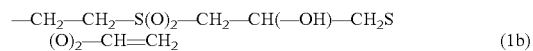

where each $R^a$ is independently selected from C$_{1-3}$ alkanediyl and substituted C$_{1-3}$ alkanediyl, wherein the one or more substituent groups is —OH.

A Michael acceptor compound may accordingly be used as polyene (a) in the curable composition according to the present invention. A "Michael acceptor compound" refers to a compound comprising at least one terminal Michael acceptor group. In certain examples, a Michael acceptor compound is a divinyl sulfone, and a Michael acceptor group is vinylsulfonyl, i.e.,

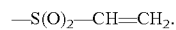

For example, a Michael acceptor compound may be a bis(vinylsulfonyl)alkanol, and a Michael acceptor group may e.g. be 1-(ethylenesulfonyl)-n-(vinylsulfonyl)alkanol, or 1-(ethylenesulfonyl)-3-(vinylsulfonyl)propan-2-ol.

A Michael acceptor group that can be present in compounds suitable as polyene (a) in curable compositions according to the present invention may also be a maleimide and in certain examples, a 1-(4-(4-(3-yl-2,5-dioxopyrrolidin-1-yl)benzyl)phenyl)-1H-pyrrole-2,5-dione group.

Michael addition chemistries may be employed in a variety of ways to provide curable compositions suitable in particular for use in aerospace sealant applications. For example, a curable composition provided by the present disclosure may comprise (i) a thiol terminated sulfur-containing prepolymer as the polythiol (b) and a Michael acceptor-terminated sulfur-containing prepolymer as the polyene (a); (ii) a mixture of a thiol-terminated sulfur-containing prepolymer and a low molecular weight polythiol as the polythiol (b), and a Michael acceptor-terminated sulfur-containing prepolymer as the polyene (a); (iii) a thiol terminated sulfur-containing prepolymer as the polythiol (b), and a mixture of a Michael acceptor-terminated sulfur-containing prepolymer and a low molecular weight compound having at least two Michael acceptor groups as the polyene (a); or (iv) a mixture of a thiol-terminated sulfur-containing prepolymer and a low molecular weight polythiol as the polythiol (b), and a mixture of a Michael acceptor-terminated sulfur-containing prepolymer and a low molecular weight compound having at least two Michael acceptor groups as the polyene (a).

Michael acceptor-terminated sulfur-containing prepolymers and thiol-terminated sulfur-containing polymers may be derived from polythioethers, polysulfides, sulfur-containing polyformals, or combinations of any of the foregoing.

Low molecular weight polythiols and low molecular weight Michael acceptors compounds can have an average molecular weight less than about 400 Daltons, or less than about 1,000 Daltons.

Michael acceptor-terminated sulfur-containing prepolymers can have at least two terminal unsaturated groups that are activated for Michael addition such as activated unsaturated groups that serve as a Michael addition acceptor.

Michael acceptor-terminated sulfur-containing prepolymers that can be used as polyene (a) in the curable compositions according to the present invention typically comprise at least two terminal Michael acceptor groups. Suitable Michael-acceptor-terminated sulfur-containing prepolymers may thus for instance be difunctional, or may have a functionality greater than 2 such as 3, 4, 5, or 6. The Michael-acceptor-terminated sulfur-containing prepolymer may also comprise a mixture of Michael-acceptor-terminated sulfur-containing prepolymers, which can have different functionalities, characterized by an average functionality from 2.05 to 6, from 2.1 to 4, from 2.1 to 3, from 2.2 to 2.8, or from 2.4 to 2.6. Accordingly, suitable Michael-acceptor-terminated sulfur-containing prepolymers can have at least two terminal Michael acceptor groups, or can have two terminal Michael acceptor groups, 3, 4, 5, or 6 terminal Michael acceptor groups. A Michael-acceptor-terminated sulfur-containing prepolymer may also comprise a combination of adducts, which may each have different numbers of terminal Michael acceptor groups, characterized, for example, by an average Michael acceptor functionality of from 2.05 to 6, from 2.1 to 4, from 2.1 to 3, from 2.2 to 2.8, or from 2.4 to 2.6.

Suitable Michael acceptor-terminated sulfur-containing prepolymers include Michael acceptor-terminated polythioethers, Michael acceptor-terminated polysulfides, Michael acceptor-terminated sulfur-containing polyformals, and combinations of any of the foregoing. For example, any of the polythioethers, polysulfides, and sulfur-containing polyformals suitable for use as thiol-terminated sulfur-containing prepolymers may also be used as the backbone for a Michael acceptor-terminated sulfur-containing prepolymer.

Michael acceptor-terminated sulfur containing prepolymers suitable for use in aerospace sealant applications are disclosed, for example, in U.S. Application Publication Nos. 2014/0378649, 2014/0378649, and 2015/0119549, each of which is incorporated by reference in its entirety.

As mentioned above, a Michael acceptor-terminated sulfur-containing prepolymer useful as polyene (a) in the curable compositions according to the present invention can comprise a Michael acceptor-terminated polythioether.

A Michael acceptor-terminated sulfur-containing prepolymer can, for example, comprise a Michael acceptor-terminated polythioether comprising: (a) a backbone comprising the structure of Formula (2):

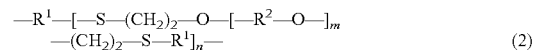

$$-R^1-[-S-(CH_2)_2-O-[-R^2-O-]_m-(CH_2)_2-S-R^1]_n- \quad (2)$$

where (i) each $R^1$ is independently selected from a $C_{2\text{-}10}$ n-alkanediyl group, a $C_{3\text{-}6}$ branched alkanediyl group, a $C_{6\text{-}8}$ cycloalkanediyl group, a $C_{6\text{-}10}$ alkanecycloalkanediyl group, a divalent heterocyclic group, a $-[(-CHR^3-)_p-X-]_q-(CHR^3)_r-$ group, wherein each $R^3$ is independently selected from hydrogen and methyl; (ii) each $R^2$ is independently selected from a $C_{2\text{-}10}$ n-alkanediyl group, a C branched alkanediyl group, a $C_{6\text{-}8}$ cycloalkanediyl group, a $C_{6\text{-}14}$ alkanecycloalkanediyl group, a divalent heterocyclic group, and a $-[(-CH_2-)_p-X-]_q-(CH_2)_r-$ group; (iii) each X is independently selected from O, S, and a $-NR^4-$ group, in which $R^4$ is selected from H and a methyl group; (iv) m is an integer ranging from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two terminal Michael acceptor groups, which can each individually be selected from any of the Michael acceptor groups described herein.

In a compound of Formula (2), $R^1$ can in particular be $-[-(CHR^3)_p-X-]_q-(CHR^3)_r-$ wherein each X can independently be selected from $-O-$ and $-S-$, wherein usually each X is $-O-$ or each X is $-S-$.

More specifically in a compound of Formula (2), $R^1$ can in particular be $-[-(CH_2)_p-X-]_q-(CH_2)_r-$ wherein each X can independently be selected from $-O-$ and $-S-$. Usually each X is $-O-$ or each X is $-S-$ herein.

Even more specifically, in a compound of Formula (2), $R^1$ can be $-[(-CH_2-)_p-X-]_q-(CH_2)_r-$, wherein p can be 2, X can be O, q is 2, r can be 2, $R^2$ can be ethanediyl, m can be 2, and n can be 9.

A Michael acceptor-terminated sulfur-containing prepolymer useful as polyene (a) according to the present invention can e.g. comprise a Michael acceptor-terminated polythioether of Formula (3a), a Michael acceptor-terminated polythioether of Formula (3b), or a combination thereof;

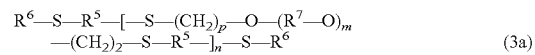

$$R^6-S-R^5-[-S-(CH_2)_p-O-(R^7-O)_m-(CH_2)_2-S-R^5-]_n-S-R^6 \quad (3a)$$

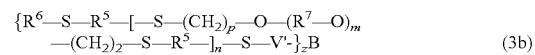

$$\{R^6-S-R^5-[-S-(CH_2)_p-O-(R^7-O)_m-(CH_2)_2-S-R^5-]_n-S-V'-\}_zB \quad (3b)$$

wherein: each $R^5$ independently is selected from $C_{2\text{-}10}$ alkanediyl, $C_{6\text{-}8}$ cycloalkanediyl, $C_{6\text{-}10}$ alkanecycloalkanediyl, $C_{5\text{-}8}$ heterocycloalkanediyl, and $-[(-CHR^8-)_s-X-]_q-(-CHR^8-)_r-$, wherein: s is an integer from 2 to 6; q is an integer from 1 to 5; r is an integer from 2 to 10; each $R^8$ is independently selected from hydrogen and methyl; and each X is independently selected from $-O-$, —S—, —NH—, and —N(—CF$_3$)—; each R$^7$ is independently selected from C$_{1-10}$ alkanediyl, C$_{6-8}$ cycloalkanediyl, C$_{6-14}$ alkanecycloalkanediyl, and —[(—CHR$^8$—)$_s$—X—]$_q$—(—CHR$^8$—)$_r$—, wherein s, q, r, R$^8$, and X are as defined for R$^5$; m is an integer from 0 to 50; n is an integer from 1 to 60; p is an integer from 2 to 6; B represents a core of a z-valent, polyfunctionalizing agent B(—V)$_z$ wherein: z is an integer from 3 to 6; and each V is a group comprising a terminal group reactive with thiol groups; and each —V'— is derived from the reaction of —V with a thiol; and each R$^6$ is independently a moiety comprising a terminal Michael acceptor group.

In prepolymers of Formula (3a) and Formula (3b), R$^5$ can in particular be —[(—CH$_2$—)$_s$—X—]$_q$—(CH$_2$)$_r$—, where s can be 2, X can be —O—, q can be 2, r can be 2, R$^7$ can be ethanediyl, m can be 2, and n can be 9.

In prepolymers of Formula (3a) and Formula (3b), R$^5$ can for instance be selected from C$_{2-6}$ alkanediyl and —[—(CHR$^8$)$_s$—X—]$_q$—(CHR$^8$)$_r$—.

In prepolymers of Formula (3a) and Formula (3b), R$^5$ can in particular be —[—(CHR$^8$)$_s$—X—]$_q$—(CHR$^8$)$_r$—, where X is —O— or X is —S—.

More specifically, in prepolymers of Formula (3a) and Formula (3b), R$^5$ can be —[—(CHR$^8$)$_s$—X—]$_q$—(CHR$^8$)$_r$—, wherein s can be 2, r can be 2, q can be 1, and X can be —S—; or wherein s can be 2, q can be 2, r can be 2, and X can be —O—; or wherein s can be 2, r can be 2, q can be 1, and X can be —O—.

Moreover, in prepolymers of Formula (3a) and Formula (3b), where R$^5$ can be —[—(CHR$^8$)$_s$—X—]$_q$—(CHR$^8$)$_r$—, each R$^8$ or at least one R$^8$ can be methyl.

In prepolymers of Formula (3a) and Formula (3b), each R$^5$ can be the same or at least one R$^5$ can be different.

In prepolymers of Formula (3b), each —V can comprise a terminal alkenyl group.

In adducts of Formula (3a) and Formula (3b), each R$^6$ can independently be selected e.g. from a vinyl ketone, a vinyl sulfone, and a quinone. Each of the Michael acceptor groups may be the same or at least some of the Michael acceptor groups are different from each other.

In adducts of Formula (3a) and Formula (3b), each R$^6$ can likewise independently be a bis(sulfonyl)alkanol group.

In adducts of Formula (3a) and Formula (3b), each R$^6$ can also independently be derived from a bis(sulfonyl)alkanol and have the structure of Formula (4a) or Formula (4b);

—CH$_2$—CH$_2$—S(O)$_2$—R$^9$—CH(—OH)—R$^9$—
S(O)$_2$—CH=CH$_2$  (4a)

—CH$_2$—CH$_2$—S(O)$_2$—CH$_2$—CH(—OH)—CH$_2$—
S(O)$_2$—CH=CH$_2$  (4b)

where each R$^9$ is independently selected from C$_{1-3}$ alkanediyl.

A Michael acceptor group terminating a sulfur-containing prepolymer useful as polyene in curable compositions according to the present invention is however not particularly limited and may generally be any suitable Michael acceptor group.

In prepolymers of Formula (3a) and Formula (3b), each R$^6$ can for example be derived from a bismaleimide such as 1,1'-(ethylenebis(4,1-phenylene)bis(1H-pyrrole-2,5-dione), ethylenebismaleimide, 1,6-bismaleimidohexane, 2,4-dimaleimidotoluene, N,N'-1,3-phenylenedimaleimide; 1,4-bis(maleimido)butane trimethylenebismaleimide; p,p'-dimaleimidodiphenylmethane; pentamethylenebismaleimide 1H-pyrrole-2,5-dione, 1,1'-(1,8-octanediyl)bis-, 1H-pyrrole-2,5-dione, 1,1'-(1,7-heptanediyl)bis-, 4,4'-dithiobis(phenylmaleimide); methylenebis(N-carbamylmaleimide), 1,9-bis(maleimide)nonane; 1,1'-decane-1,10-diylbis(1H-pyrrole-2,5-dione); O-phenylene dimaleimide, bis(N-maleimidomethyl)ether, 1,5-bis(maleimide)-2-methyl-pentane; N,N'-1,4-phenylenedimaleimide; 1,1'-(2-methyl-1,3-phenylene)bis(1H-pyrrole-2,5-dione); Kerimid 601 resin; tetrakis(N-2-aminoethylmaleamide); 1-(2,5-dimethylphenyl)pyrrole-2,5-dione; SureCN331305; SureCN349749; or 1,1'-biphenyl-4,4'-diylbis(1H-pyrrole-2,5-dione).

The Michael acceptor-terminated sulfur-containing prepolymer can comprise at least two terminal maleimide groups.

As already indicated above, the Michael acceptor group can likewise comprise a bis(sulfonyl)alkanol group such as a 1-(ethylenesulfonyl)-n-(vinylsulfonyl)alkanol group, or a 1-(ethylenesulfonyl)-3-(vinylsulfonyl)propan-2-ol group. Each of the Michael acceptor groups of the Michael acceptor-terminated sulfur containing prepolymer may be the same or at least some of the Michael acceptor groups are different from each other.

A "bis(sulfonyl)alkanol group" refers to a group comprising a moiety of the general formula:

—S(O)$_2$—R$^{10}$—CH(—OH)—R$^{10}$—S(O)$_2$— where each R$^{10}$ is independently selected from C$_{1-3}$ alkanediyl and substituted C$_{1-3}$ alkanediyl, where the one or more substituent groups is —OH. In certain examples, bis(sulfonyl)alkanol group has the structure:

—CH$_2$—CH$_2$—S(O)$_2$—R$^{10}$—CH(—OH)—R$^{10}$—S(O)$_2$—CH$_2$—CH$_2$— and in certain instances, the structure:

R$^{11}$—S(O)$_2$—R$^{10}$—CH(—OH)—R$^{10}$—S(O)$_2$—R$^{11}$ where each R$^{11}$ is a moiety having a terminal reactive group. Each R$^{11}$ may comprise a terminal group reactive with a thiol group such as, for example, an alkenyl group, an epoxy group, or a Michael acceptor group. In certain instances, a bis(sulfonyl)alkanol may be a bis(vinylsulfonyl)alkanol comprising terminal alkenyl groups. For example, a bis(sulfonyl)alkanol may be a bis(vinylsulfonyl)alkanol in which R$^{11}$ comprises a terminal alkenyl group, such as a compound having the formula:

CH$_2$=CH—S(O)$_2$—R$^{10}$—CH(—OH)—R$^{10}$—
S(O)$_2$—CH=CH$_2$.

The bis(vinylsulfonyl)alkanol may e.g. comprise 1,3-bis(vinylsulfonyl)-2-propanol. A bis(sulfonyl)alkanol can be prepared by reacting a bis(vinylsulfonyl)alkanol with a compound having a terminal group reactive with the terminal alkenyl groups of the bis(vinylsulfonyl)alkanol such as a thiol group or an epoxy group. In such situations, the bis(sulfonyl)alkanol can have the structure:

R$^{12}$—CH$_2$—CH$_2$—S(O)$_2$—R$^{10}$—CH(—OH)—R$^{10}$—
S(O)$_2$—CH$_2$—CH$_2$—R$^{12}$ where each R$^{12}$ is a moiety derived from the reaction of the compound with the terminal alkenyl groups of the bis(vinylsulfonyl)alkanol.

A "bis(sulfonyl)alkanol group" can alternatively be a monovalent bis(sulfonyl)alkanol group or a divalent bis(sulfonyl)alkanol group. A monovalent bis(sulfonyl)alkanol group can be a terminal bis(sulfonyl)alkanol group such as a "1-(ethylenesulfonyl)-n-(vinylsulfonyl)alkanol group." A terminal bis(sulfonyl)alkanol group can be derived from the reaction of a bis(sulfonyl)alkanol and can have a terminal moiety with the general structure —R$^{13}$—S(O)$_2$—R$^{15}$—CH(—OH)—R$^{15}$—S(O)$_2$—R$^{14}$ where R$^{13}$ is a moiety derived from the reaction of a bis(sulfonyl)alkanol with a compound having a group reactive with the bis(sulfonyl)alkanol; each $R^{15}$ is independently selected from $C_{1-3}$ alkanediyl, and substituted $C_{1-3}$ alkanediyl, wherein the one or more substituent groups is —OH. $R^{14}$ may be an alkylene group such as —CH=CH$_2$. In certain examples, a terminal bis(sulfonyl)alkanol group is a 1-(ethylenesulfonyl)-n-(vinylsulfonyl)alkanol group such as 1-(ethylenesulfonyl)-3-(vinylsulfonyl)propan-2-ol, i.e., —CH$_2$—CH$_2$—S(O)$_2$—CH$_2$—CH(—OH)—CH$_2$—S(O)$_2$—CH=CH$_2$. A monovalent terminal bis(sulfonyl)alkanol group may e.g., have the structure —CH$_2$—CH$_2$—S(O)$_2$—R$^{15}$—CH(—OH)—R$^{15}$—S(O)$_2$—CH=CH$_2$.

In certain examples, a bis(sulfonyl)alkanol group can also be divalent such as when the group is incorporated into the backbone of a prepolymer such as the polythioethers disclosed herein. A divalent bis(sulfonyl)alkanol group can have the general structure —R$^{13}$—S(O)$_2$—R$^{15}$—CH(—OH)—R$^{15}$—S(O)$_2$—R$^{13}$—; or —CH$_2$—CH$_2$—S(O)$_2$—R$^{15}$—CH(—OH)—R$^{15}$—S(O)$_2$—CH$_2$—CH$_2$—, or —R$^{13}$—S(O)$_2$CH$_2$—CH(—OH)—CH$_2$—S(O)$_2$—R$^{13}$—, or —CH$_2$—CH$_2$—S(O)$_2$—CH$_2$—CH(—OH)—CH$_2$—S(O)$_2$—CH$_2$—CH$_2$—, where $R^{13}$ and $R^{15}$ are as defined above. Each $R^{13}$ may e.g. be an ethane-diyl group and/or each $R^{15}$ may be methanediyl.

A "bis(sulfonyl)alkanol-containing" polymer, prepolymer, or adduct refers to a polymer, prepolymer, or adduct in which one or more divalent bis(sulfonyl)alkanol groups are incorporated into the backbone of the polymer, prepolymer, or adduct.

A divalent bis(sulfonyl)alkanol group can be incorporated in a prepolymer by reacting, for example, in a suitable ratio, a polythiol monomer or prepolymer of Formula A with a bis(sulfonyl)alkanol of Formula B:

$$R(—SH)_w \quad (A)$$

$$R^{16}—S(O)_2—R^{17}—CH(—OH)—R^{17}—S(O)_2—R^{16} \quad (B)$$

where R is an organic moiety, each $R^{17}$ is independently selected from $C_{1-3}$ alkanediyl and substituted $C_{1-3}$ alkanediyl, wherein the one or more substituent groups is —OH; w is an integer of at least 2 and each $R^{16}$ comprises a terminal group that is reactive with a thiol group such as, for example, an alkylene group, and epoxy group, or a group comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc. In certain situations, a bis(sulfonyl)alkanol of Formula B may be a bis(vinylsulfonyl)alkanol having the formula $$CH_2=CH—S(O)_2—R^{17}—CH(—OH)—R^{17}—S(O)_2—CH=CH_2$$

where each $R^{17}$ is as defined above. A suitable bis(sulfonyl)alkanol may for instance be exemplified by 1,3-bis(vinylsulfonyl)-2-propanol. Alternatively, a bis(sulfonyl)alkanol group can be incorporated into a prepolymer backbone by reacting, in a suitable ratio, a thiol-capped bis(sulfonyl)alkanol of Formula C with a reactant of Formula D:

$$HS—R—S(O)_2—R^{17}—CH(—OH)R^{17}—S(O)_2—R—SH \quad (C)$$

$$R''—R—R'' \quad (D)$$

where each R is a divalent moiety, each $R^{17}$ is as defined herein, and each R" comprises a terminal group that is reactive with a thiol group such as, for example, an alkenyl group, an epoxy group, or a group consisting of a saturated carbon bearing a leaving group that are well known for nucleophilic substitution such as, for example, —Cl, —Br, —I, —OSO$_2$CH$_3$ (mesylate), —OSO$_2$—C$_6$H$_4$—CH$_3$ (tosylate), etc.

By choosing the appropriate ratio of the reactants of Formula A and Formula B, or Formula C and Formula D, one or more bis(sulfonyl)alkanol groups can be incorporated into a prepolymer as either a chain segment, as part of a terminal bearing a reactive group, or both. For example, bis(vinylsulfonyl)alkanol can be used to introduce one or more 1,n-bis(ethylenesulfonyl)alkanol groups into the backbone of a prepolymer chain, one or more terminal 1-(ethylenesulfonyl)-n-(vinylsulfonyl)alkanol groups, or both.

It may e.g. be desirable to react bis(vinylsulfonyl)-2-propanol with thiol-capped monomers/polymers to incorporate 1,3-bis(ethylenesulfonyl)-2-propanol groups into the polymer chain.

Bis(vinylsulfonyl)-2-propanol can likewise be reacted with thiol-capped monomers/polymers to provide 1-(ethylenesulfonyl)-3-(vinylsulfonyl)-2-propanol terminal groups, where the terminal alkenyl group is a well-recognized Michael acceptor.

A moiety derived from the reaction of a bis(sulfonyl)alkanol with a thiol group refers to the reaction product of a thiol group and a moiety containing a terminal group reactive with the thiol group. Examples of terminal groups reactive with thiol groups include epoxy groups, ethylene groups, and Michael acceptor groups. In certain examples, a moiety derived from the reaction of a bis(sulfonyl)alkanol with a thiol group has the structure: —CH$_2$—CH$_2$—R—, —CH(—OH)—CH$_2$—R—, —CH$_2$—CH(—OH)—R—, or —CH$_2$—CH$_2$—SO$_2$—, where R refers to a covalent bond or an organic moiety bonded to a sulfonyl group.

Michael acceptor-terminated sulfur-containing prepolymers useful as polyene (a) in the curable compositions according to the present invention may for instance comprise at least two terminal 1-(ethylenesulfonyl)-n-(vinylsulfonyl)alkanol groups, such as two terminal 1-(ethylenesulfonyl)-n-(vinylsulfonyl)alkanol groups, 3, 4, 5, or 6 terminal 1-(ethylenesulfonyl)-n-(vinylsulfonyl)alkanol groups. A Michael acceptor-terminated sulfur-containing prepolymer may comprise a combination of adducts having different numbers of terminal 1-(ethylenesulfonyl)-n-(vinylsulfonyl) alkanol groups characterized, for example, by an average 1-(ethylenesulfonyl)-n-(vinylsulfonyl)alkanol functionality from 2.05 to 6, from 2.1 to 4, from 2.1 to 3, from 2.2 to 2.8, or from 2.4 to 2.6.

A Michael acceptor group, which can be present in polyenes that can be used in the curable composition according to the present invention, can also be derived from a vinyl sulfone and have the structure of Formula (5):

$$—CH_2—C(R^{18})_2—S(O)_2—CR^{18}=CH_2 \quad (5)$$

wherein each $R^{18}$ is independently selected from hydrogen and $C_{1-3}$ alkyl. In Michael acceptor groups of Formula (5), each $R^{18}$ can e.g. be hydrogen. Michael acceptor-terminated bis(sulfonyl)alkanol-containing polythioethers may be prepared, for example, by reacting a thiol-terminated bis(sulfonyl)alkanol-containing polythioether with a compound having a terminal Michael acceptor group and a group reactive with thiol groups such as a divinylsulfone, in the presence of a phosphine catalyst. Michael acceptor/polythioether chemistries and compounds are disclosed, for example, in U.S. Application Publication No. 2013/0345371, which is incorporated by reference in its entirety.

Michael acceptor-terminated sulfur-containing prepolymers used as polyene in curable compositions according of the present invention can e.g. comprise at least two terminal vinylsulfonyl groups.

In certain examples, the Michael acceptor-terminated sulfur-containing prepolymers can be terminated by at least two vinyl sulfonyl groups or at least two terminal 1-(ethylenesulfonyl)-n-(vinylsulfonyl)alkanol groups.

A compound having a Michael acceptor group and a group that is reactive with the terminal groups of the sulfur-containing polymer may be a bis(sulfonyl)alkanol having the formula R—CH$_2$—CH$_2$—S(O)$_2$—R$^{19}$—CH(—OH)—R$^{19}$—S(O)$_2$—CH=CH$_2$ where R can be a moiety having a terminal group that is reactive with the terminal groups of the sulfur-containing polymer; and each R$^{19}$ is independently selected from C$_{1-3}$ alkanediyl. A bis(vinyl) alkanol can be a bis(vinylsulfonyl)alkanol.

Sulfur-containing maleimide adducts provided by the present disclosure can comprise at least two terminal maleimide groups. A sulfur-containing maleimide adduct may comprise a mixture of sulfur-containing maleimide adducts having different functionalities characterized by an average functionality from 2.05 to 6, from 2.1 to 4, from 2.1 to 3, from 2.2 to 2.8, or from 2.4 to 2.6. Sulfur-containing maleimide adducts can have at least two terminal maleimide groups, or can have two terminal 1-(4-(4-(3-yl-2,5-dioxopyrrolidin-1-yl)benzyl)phenyl)-1H-pyrrole-2,5-dione groups, or can have more than two terminal groups such as 3, 4, 5, or 6 terminal 1-(4-(4-(3-yl-2,5-dioxopyrrolidin-1-yl)benzyl)phenyl)-1H-pyrrole-2,5-dione groups. A sulfur-containing maleimide adduct may comprise a combination of adducts having different numbers of terminal 1-(4-(4-(3-yl-2,5-dioxopyrrolidin-1-yl)benzyl)phenyl)-1H-pyrrole-2,5-dione groups characterized, for example, by an average 1-(4-(4-(3-yl-2,5-dioxopyrrolidin-1-yl)benzyl)phenyl)-1H-pyrrole-2,5-dione functionality from 2.05 to 6, from 2.1 to 4, from 2.1 to 3, from 2.2 to 2.8, or from 2.4 to 2.6.

The double bond of maleimides can react with thiol groups at pH 6.5 to 7.5 and is more reactive than (meth)acrylates. At neutral pH, the reaction of maleimides with thiols is about 1,000 times faster than the reaction of maleimides with amines. Compositions prepared from maleimide resins exhibit excellent thermomechanical stability and anti-flammability.

A maleimide-terminated sulfur-containing prepolymer can comprise a polythioether maleimide prepolymer characterized by a polythioether having at least two terminal maleimide groups such as, for example, at least two terminal 1-(4-(4-(3-yl-2,5-dioxopyrrolidin-1-yl)benzyl)phenyl)-1H-pyrrole-2,5-dione groups.

Terminal Michael acceptor groups can be selected from 1,3-bis(vinylsulfonyl-2-propanol, 1,1'-(methylenedi-4,1-phenylene)bismaleimide, or a combination thereof.

A sulfur-containing maleimide adduct useful as polyene (a) in curable compositions according to the present invention can e.g. comprise a polythioether maleimide adduct comprising:

(a) a backbone comprising the structure of Formula (6):

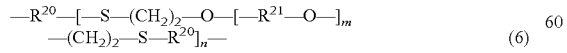

where (i) each R$^{20}$ is independently selected from a C$_{2-10}$ n-alkanediyl group, a C$_{3-6}$ branched alkanediyl group, a C$_{6-8}$ cycloalkanediyl group, a C$_{6-10}$ alkanecycloalkanediyl group, a heterocyclic group, a —[(—CHR$^{22}$—)$_p$—X—]$_q$—(CHR$^{22}$)$_r$— group, wherein each R$^{22}$ is independently selected from hydrogen and methyl; (ii) each R$^{21}$ is independently selected from a C$_{2-10}$ n-alkanediyl group, a C$_{3-6}$ branched alkanediyl group, a C$_{6-8}$ cycloalkanediyl group, a C$_{6-14}$ alkanecycloalkanediyl group, a heterocyclic group, and a —[(—CH$_2$—)$_p$—X—]$_q$—(CH$_2$)$_r$— group; (iii) each X is independently selected from O, S, and a —NR$^{23}$— group, in which R$^{23}$ is selected from H and a methyl group; (iv) m is an integer ranging from 0 to 50; (v) n is an integer ranging from 1 to 60; (vi) p is an integer ranging from 2 to 6; (vii) q is an integer ranging from 1 to 5; and (viii) r is an integer ranging from 2 to 10; and (b) at least two terminal maleimide groups, which can e.g., be individually selected from any of the terminal maleimide groups described herein.

In an adduct of Formula (6), R$^{20}$ can for instance be —[—(CHR$^{22}$)$_p$—X—]$_q$—(CHR$^{22}$)$_r$— wherein each X is independently selected from —O— and —S—

More specifically, in an adduct of Formula (6), R$^{20}$ can be —[—(CH$_2$)$_p$—X—]$_q$—(CH$_2$)$_r$— wherein each X is independently selected from —O— and —S—, wherein often each X is —O— or each X is —S—.

Even more specifically, in adducts of Formula (6), R$^{20}$ can be —[(—CH$_2$—)$_p$—X—]$_q$—(CH$_2$)$_r$—, wherein p can be 2, X can be O, q can be 2, r can be 2, R$^{21}$ can be ethanediyl, m can be 2, and n can be 9.

A terminal maleimide group can have the structure of Formula (7):

A terminal bismaleimide moiety refers to a moiety having a terminal maleimide group. A terminal maleimide group can be derived from a bismaleimide, such as a compound having the structure of Formula (8a):

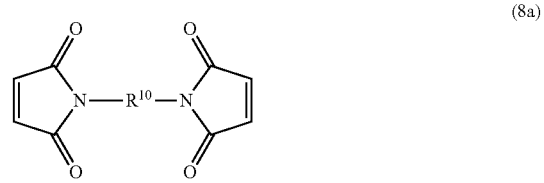

where R$^{10}$ is a divalent organic moiety, and the terminal group can have the structure of Formula (8b);

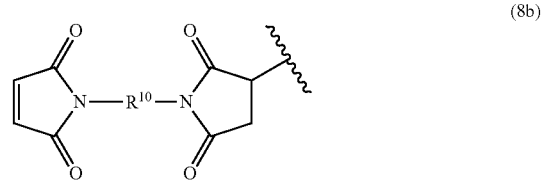

and is referred to herein as a 1-(4-(4-(3-yl-2,5-dioxopyrrolidin-1-yl)benzyl)phenyl)-1H-pyrrole-2,5-dione group. A terminal maleimide group can be derived from 1,1'-(methylenedi-4,1-phenylene)bismaleimide of Formula (9a), also referred to as 1,1'-(methylenebis(4,1-phenylene)bis(1H-pyrrole-2,5-dione), and the terminal group can have the structure of Formula (10b):

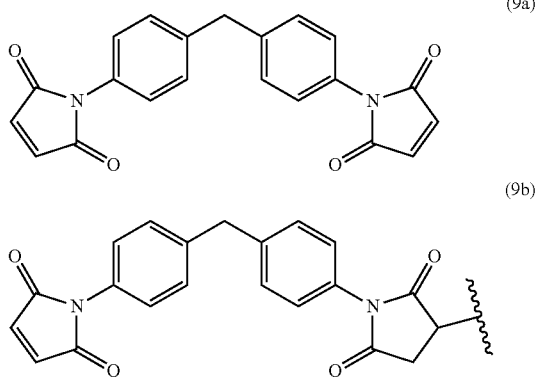

A maleimide group can comprise 1-(4-(4-(3-yl-2,5-dioxopyrrolidin-1-yl)benzyl)phenyl)-1H-pyrrole-2,5-dione group. Each of the terminal maleimide groups may be the same or at least some of the terminal maleimide groups are different from each other.

Other examples of compounds having two or more maleimide groups include ethylenebismaleimide; 1,6-bismaleimidohexane: 2,4-dimaleimidotoluene, N,N'-1,3-phenylenedimaleimide; 1,4-bis(maleimido)butane trimethylenebismaleimide; p,p'-dimaleimidodiphenylmethane; pentamethylenebismaleimide 1H-pyrrole-2,5-dione; 1,1'-(1, 8-octanediyl)bis-, 1H-pyrrole-2,5-dione, 1,1'-(1,7-heptanediyl)bis-, 4,4'-dithiobis(phenylmaleimide); methylenebis(N-carbamylmaleimide), 1,9-bis(maleimide)nonane; 1,1'-decane-1,10-diylbis(1H-pyrrole-2,5-dione); O-phenylene dimaleimide, bis(N-maleimidomethyl)ether; 1,5-bis(maleimide)-2-methyl-pentane; N,N'-1,4-phenylenedimaleimide; 1,1'-(2-methyl-1,3-phenylene)bis(1H-pyrrole-2,5-dione); Kerimid 601 resin; tetrakis(N-2-aminoethylmaleimide); 1-(2,5-dimethylphenyl)pyrrole-2,5-dione; SureCN331305, SureCN349749; or 1,1'-biphenyl-4,4'-diylbis(1H-pyrrole-2,5-dione).

To prepare a Michael acceptor-terminated sulfur-containing prepolymer, a sulfur-containing prepolymer such as those disclosed herein may be reacted with a compound having a Michael acceptor group and a group that is reactive with the terminal groups of the sulfur-containing prepolymer.

A Michael acceptor group can, for example, be selected from a vinyl ketone, a vinyl sulfone, a maleimide, and a quinone. In compounds in which a Michael acceptor group is derived from divinyl sulfone, the sulfur-containing prepolymer may be thiol-terminated such as a thiol-terminated polythioether, a thiol-terminated polysulfide, or a combination thereof.

The polyene (a) is typically present in the curable composition of the present invention in an amount of 10 to 90 percent by weight, based on the total weight of components (a) and (b) in the curable composition. For example, the polyene (a) may be present in the curable composition in an amount of at least 10 percent by weight, often at least 30 percent by weight, or at least 50 percent by weight, or even at least 60 percent by weight, based on the total weight of components (a) and (b) in the curable composition, as demonstrated in the examples below. Moreover, the polyene (a) may be present in the curable composition in an amount up to 75 percent by weight, often up to 60 percent by weight, based on the total weight of resin solids in the curable composition.

Curable compositions of the present invention further include (b) a polythiol. As used herein the term "polythiol" refers to compounds containing two or more thiol functional groups (—SH). Suitable polythiols (b) for use in the curable composition according to the present invention are numerous and can vary widely. Such polythiols can include those that are known in the art. Examples of suitable polythiols can include, but are not limited to, polythiols having at least two thiol groups including monomeric compounds, oligomers, prepolymers and polymers. The polythiol can have ether linkages (—O—), thioether linkages (—S—), including polysulfide linkages (—$S_x$—), wherein x is at least 2, such as from 2 to 4, and combinations of such linkages.

The polythiols (b) for use in the present invention include materials of the formula:

$$R^{24}—(SH)_n$$

wherein $R^{24}$ is an organic moiety and n is an integer of at least 2, typically 2 to 6. Such polythiol may for instance comprise a reaction product of a thiol-functional organic acid and a polyol. Accordingly, the organic moiety $R_1$ can contain ester groups and/or be derived from a polyol.

Examples of suitable polythiols that can be used in the curable compositions according to the present invention may thus e.g. include esters of thiol-containing acids of the formula HS—$R^{25}$—COOH, wherein $R^{25}$ is an organic moiety, with polyhydroxy compounds of the structure $R^{26}$—(OH)$_n$ wherein $R^{26}$ is an organic moiety and n is at least 2, typically 2 to 6. The thiol-containing acid component and the polyhydroxy component can be reacted under suitable conditions to give polythiols having the general structure:

$$R^{26}—(OC(=O)—R^{25}—SH)_n$$

Examples of such esters of thiol-containing acids include esters of thioglycolic acid (HS—$CH_2COOH$), α-mercaptopropionic acid (HS—CH($CH_3$)—COOH) or β-mercaptopropionic acid (HS—$CH_2CH_2COOH$) with polyhydroxy compounds such as glycols, triols, tetraols, pentaols, hexaols, and mixtures thereof. Specific examples of suitable polythiols include for instance ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis (β-mercaptopropionate), and mixtures thereof.

A suitable polythiol (b) for use in curable compositions according to the present invention particularly useful for the aerospace industry may include a thiol-terminated sulfur-containing prepolymer such as a thiol-terminated polythioether prepolymer, a thiol-terminated polysulfide prepolymer, a thiol-terminated sulfur-containing polyformal prepolymer, or combinations of any of the foregoing. The thiol-terminated sulfur-containing prepolymer may also comprise a mixture of different polythioethers and/or polysulfides, and the polythioethers and/or polysulfides may have the same or different thiol functionality. A thiol-terminated sulfur-containing prepolymer can have an average thiol functionality from 2 to 6, from 2 to 4, from 2 to 3, or from 2.05 to 2.8. For example, a thiol-terminated sulfur-containing prepolymer can comprise a difunctional thiol-terminated sulfur-containing polymer, a bifunctional thiol-terminated sulfur-containing polymer, or a combination thereof.

Examples of suitable thiol terminated polythioether prepolymers for use in curable compositions provided by the present disclosure are disclosed, for example, in U.S. Pat. No. 6,172,179.

A thiol-terminated sulfur-containing prepolymer suitable as polythiol (b) in the curable compositions according to the present invention can e.g. comprise a backbone comprising the structure of Formula (10):

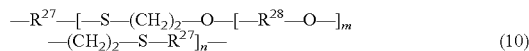
(10)

wherein:
(i) each $R^{27}$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a divalent heterocyclic group, and a $—[(—CHR^{29}—)_p—X—]_q—(CHR^{29})_r—$ group, wherein each $R_{29}$ is selected from hydrogen and methyl;
(ii) each $R^{29}$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a divalent heterocyclic group, and a $—[(—CH_2—)_p—X—]_q—(CH_2)_r—$ group;
(iii) each X is independently selected from O, S, —NH— and —N(—CH$_3$)—;
(iv) m is an integer ranging from 0 to 50;
(v) n is an integer ranging from 1 to 60;
(vi) p is an integer ranging from 2 to 6;
(vii) q is an integer ranging from 1 to 5; and
(viii) r is an integer ranging from 2 to 10.

A thiol-terminated sulfur-containing prepolymer suitable as polythiol (b) in the curable compositions according to the present invention can e.g. comprise a thiol-terminated polythioether prepolymer of Formula (11a), a thiol-terminated polythioether prepolymer of Formula (11b), or a combination thereof:

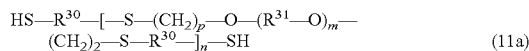
(11a)

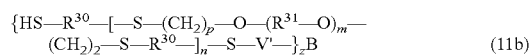
(11b)

wherein:
each $R^{30}$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^{32}—)_s—X—]_q—(—CHR^{32}—)_r—$, wherein:
s is an integer from 2 to 6; q is an integer from 1 to 5; r is an integer from 2 to 10; each $R^{32}$ is independently selected from hydrogen and methyl; and each X is independently selected from —O—, —S—, —NH— and —N(—CH$_3$)—; each $R^{31}$ is independently selected from $C_{1-10}$ alkanediyl, $C_{6-8}$ cycloalkanediyl, $C_{6-14}$ alkanecycloalkanediyl, and $—[(—CHR^{32}—)_s—X—]_q—(—CHR^{32}—)_r—$, wherein s, q, r, $R^{32}$, and X are as defined as for $R^{30}$; m is an integer from 0 to 50; n is an integer from 1 to 60; p is an integer from 2 to 6; B represents a core of a z-valent, vinyl-terminated polyfunctionalizing agent B(—V)$_z$ wherein: z is an integer from 3 to 6; and each V is a group comprising a terminal vinyl group; and each —V'— is derived from the reaction of —V with a thiol.

In prepolymers of Formula (11a) and Formula (11b), $R^{30}$ can for instance be $—[(—CH_2—)_s—X—]_q—(CH_2)_r—$, where s can be 2, X can be —O—, q can be 2, r can be 2, $R^2$ can be ethanediyl, m can be 2, and n can be 9.

In prepolymers of Formula (11a) and Formula (11b), $R^{30}$ can e.g. be selected from $C_{2-6}$ alkanediyl and $—[(—CHR^{32})_s—X—]_q—(CHR^{32})_r—$.

In prepolymers of Formula (11a) and Formula (11b), $R^{30}$ can in particular be $—[(—CHR^{32})_s—X—]_q—(CHR^{32})_r—$, wherein X is —O— or X is —S—.

In specific prepolymers of Formula (11a) and Formula (11b), $R^{30}$ can e.g. be $—[(—CHR^{32})_s—X—]_q—(CHR^{32})_r—$, wherein s is 2, r is 2, q is 1, and X is —S—; or s is 2, q is 2, r is 2, and X is —O—; or s is 2, r is 2, q is 1, and X is —O—.

Furthermore, in prepolymers of Formula (11a) and Formula (11b), $R^{30}$ can be $—[(—CHR^{32})_s—X—]_q—(CHR^{32})_r—$, wherein each $R^{32}$ is hydrogen or at least one $R^{32}$ is methyl.

In prepolymers of Formula (11a) and Formula (11b), each $R^{30}$ can generally be the same, or at least one $R^{30}$ can be different.

Various methods can be used to prepare the thiol-terminated polythioether prepolymers useful as polythiol in the curable compositions according to the present invention. Examples of suitable thiol-terminated polythioether prepolymers, and methods for their production, are described, for example, in U.S. Pat. No. 6,172,179. The thiol-terminated polythioether prepolymers may be difunctional, such as linear prepolymers having two thiol terminal groups, or polyfunctional, such as branched prepolymers having three or more terminal thiol groups. Thiol-terminated polythioether prepolymers may also comprise a combination of difunctional and polyfunctional thiol-terminated polythioether prepolymers. Suitable thiol-terminated polythioether prepolymers are commercially available, for example, as Permapol® P3.1E, from PRC-DeSoto International Inc., Sylmar, Calif.

Suitable difunctional thiol-terminated polythioether prepolymers may e.g. be produced by reacting a divinyl ether or mixtures of divinyl ethers with an excess of dithiol or a mixture of dithiols. For example, dithiols suitable for use in preparing thiol-terminated polythioether prepolymers include those having the structure of Formula (12), other dithiols disclosed herein, or combinations of any of the dithiols disclosed herein.

A dithiol useful in preparing a thiol-terminated polythioether provided by the present disclosure can e.g. have the structure of Formula (12):

(12)

wherein: $R^{33}$ is selected from $C_{2-6}$ alkanediyl, $C_{6-8}$ cycloalkanediyl, $C_{6-10}$ alkanecycloalkanediyl, $C_{5-6}$ heterocycloalkanediyl, and $—[(—CHR^{34})_p—X—]_q—(CHR^{34})_r—$; wherein; each $R^{34}$ is independently selected from hydrogen and methyl; each X is independently selected from —O—, —S—, —NH— and —NR— wherein R is selected from hydrogen and methyl; p is an integer from 2 to 6; q is an integer from 1 to 5; and r is an integer from 2 to 10.

In dithiols of Formula (12), $R^{33}$ can in particular be $—[(—CHR^{34})_p—X—]_q—(CHR^{34})_r—$.

In dithiols of Formula (12), X can in particular be —O— or —S—, and thus $—[(—CHR^{34})_p—X—]_q—(CHR^{34})_r—$ in Formula (12) can be $—[(—CHR^{34})_p—O—]_q—(CHR^{34})_r—$ or $—[(—CHR^{34})_p—S—]_q—(CHR^{34})_r—$. In moieties having the structure $—[(—CHR^{34})_p—X—]_q—(CHR^{34})_r—$, p and r can be the same, such as both p and r can be two.

In dithiols of Formula (12), $R^{33}$ can for instance be $C_{2-6}$ alkanediyl or $—[(—CHR^{34})_p—X—]_q—(CHR^{34})_r—$.

In dithiols of Formula (12), where $R^{33}$ is —[(CHR$^{34}$)$_p$—X—]$_q$—(CHR$^{34}$)$_r$—, in particular X can be —O— or X can be —S—.

In dithiols of Formula (12), $R^{33}$ can e.g. be —[—(CHR$^{34}$)$_p$—X—]$_q$—(CHR$^{34}$)$_r$—, wherein p can be 2, r can be 2, q can be 1, and X can be —S—; or p can be 2, q can be 2, r can be 2, and X can be —O—; or p can be 2, r can be 2, q can be 1, and X can be —O—.

In dithiols of Formula (12), $R^{33}$ can e.g., be —[(—CHR$^{34}$)$_p$—X—]$_q$—(CHR$^{34}$)$_r$—, wherein each $R^{34}$ is hydrogen or at least one $R^{34}$ is methyl.

Specific non-limiting examples of suitable dithiols useful in preparing the thiol-terminated polythioether prepolymer include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower (e.g., $C_{1-6}$) alkoxy group, and a hydroxyl group. Suitable alkyl pendant groups include, for example, $C_{1-6}$ linear alkyl, $C_{3-6}$ branched alkyl, cyclopentyl, and cyclohexyl.

Thus it is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Suitable divinyl ethers for use in preparing the polythioether prepolymers include, for example, divinyl ethers of Formula (13):

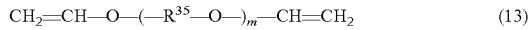

$$CH_2=CH-O-(-R^{35}-O-)_m-CH=CH_2 \quad (13)$$

where $R^{35}$ in Formula (13) can be $C_{2-6}$ n-alkanediyl, $C_{3-6}$ branched alkanediyl, $C_{6-8}$ cycloalkanediyl, $C_{6-10}$ alkanecycloalkanediyl, or —[(—CH$_2$—)$_p$—O—]$_q$—(—CH$_2$—)$_r$—, where p is an integer ranging from 2 to 6, q is an integer from 1 to 5, and r is an integer from 2 to 10.

Suitable divinyl ethers include, for example, divinyl ethers having at least one oxyalkanediyl group, such as from 1 to 4 oxyalkanediyl groups, i.e., compounds in which m in Formula (13) is an integer ranging from 1 to 4. In divinyl ethers of Formula (13), m can e.g. be an integer ranging from 2 to 4. It is also possible to employ commercially available divinyl ether mixtures that are characterized by a non-integral average value for the number of oxyalkanediyl units per molecule. Thus, m in Formula (13) can also take on rational number values ranging from 0 to 10.0, such as from 1.0 to 10.0, from 1.0 to 4.0, or from 2.0 to 4.0.

Specific non-limiting examples of suitable divinyl ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether, tetraethylene glycol divinyl ether, cyclohexanedimethanol divinyl ether, polytetrahydrofuryl divinyl ether; and combinations of two or more such divinyl ether monomers. The divinyl ether may optionally have one or more pendant groups selected from alkyl groups, hydroxyl groups, alkoxy groups, and amine groups.

In divinyl ethers of Formula (13) $R^{35}$ can e.g. be $C_{3-6}$ branched alkanediyl, which may be prepared by reacting a polyhydroxy compound with acetylene. Examples of divinyl ethers of this type include compounds in which $R^{35}$ in Formula (13) is an alkyl-substituted methanediyl group such as —CH(CH$_3$)— (for example Pluriol® blends such as Pluriol®E-200 divinyl ether (BASF Corp., Parsippany, N.J.), for which $R^{35}$ in Formula (13) is ethanediyl and m is 3.8) or an alkyl-substituted ethanediyl (for example —CH$_2$CH(CH$_3$)— such as DPE polymeric blends including DPE-2 and DPE-3; International Specialty Products, Wayne, N.J.).

Other useful divinyl ethers include divinyl ethers in which $R^{35}$ in Formula (13) is polytetrahydrofuryl (poly-THF) or polyoxyalkanediyl, such as those having an average of about 3 monomer units.

Two or more types of dithiols and/or of divinyl ether monomers of Formula (13) may be used in the preparation of the thiol-terminated polythioether prepolymers. Thus, for instance two dithiols of Formula (12) and one divinyl ether monomer of Formula (13), one dithiol of Formula (12) and two divinyl ether monomers of Formula (13), two dithiols of Formula (12) and two divinyl ether monomers of Formula (13), and more than two dithiols of Formula (12) and two divinyl ethers of Formula (13), may be used to produce a variety of thiol-terminated polythioether prepolymers.

The divinyl ether monomer can comprise from 20 mole percent to less than 50 mole percent of the reactants used to prepare the thiol-terminated polythioether prepolymer, or from 30 mole percent to less than 50 mole percent.

The relative amounts of dithiols and divinyl ethers can be selected to yield polythioether prepolymers having terminal thiol groups. Thus, a dithiol of Formula (12) or a mixture of at least two different dithiols of Formula (12), can be reacted with of a divinyl ether of Formula (13) or a mixture of at least two different divinyl ethers of Formula (13) in relative amounts such that the molar ratio of thiol groups to vinyl groups is greater than 1:1, such as 1.1 to 2.0:1.0.

Thiol-terminated polythioether prepolymers provided by the present disclosure may be prepared by combining at least one dithiol of Formula (12) and at least one divinyl ether of Formula (13) followed by addition of an appropriate catalyst, and carrying out the reaction at a temperature from 30° C. to 120° C., such as 70° C. to 90° C., for a time from 2 hours to 24 hours, such as 2 hours to 6 hours.

Thiol-terminated polythioether prepolymers may also comprise a higher functional polythioether, i.e., may have an average thiol functionality of greater than 2.0. Suitable higher functional thiol-terminated polythioether prepolymers include, for example, those having the structure of Formula (14):

$$B(-A-SH)_z \quad (14)$$

where (i) A comprises a divalent linking group, (ii) B denotes a z-valent residue of a polyfunctionalizing agent; and (iii) z can have an average value of greater than 2.0, such as an average value between 2 and 3, an average value between 2 and 4, an average value between 3 and 6, or can be an integer from 3 to 6.

Polyfunctionalizing agents suitable for use in preparing such higher functional thiol-terminated prepolymers include trifunctionalizing agents where z is 3. Suitable trifunctionalizing agents include, for example, triallyl cyanurate (TAC), 1,2,3-propanetrithiol, isocyanurate-containing trithiols, and combinations thereof, as disclosed in U.S. Application Publication No. 2010/0010133. Other useful polyfunctionalizing agents include trivinyl ether monomers, such as trimethylolpropane trivinyl ether; tetrafunctional ether monomers, such as pentaerythritol tetravinyl ether, and the polythiols described in U.S. Pat. Nos. 4,366,307; 4,609,762; and 5,225,472. Mixtures of polyfunctionalizing agents may also be used.

As a result, thiol-terminated polythioether prepolymers provided by the present disclosure can be characterized by a wide range of average thiol functionality. For example, a combination of difunctional prepolymers and trifunctional prepolymers may afford average thiol functionalities from 2.05 to 3.0, such as from 2.1 to 2.6. Wider ranges of average thiol functionality may be achieved by using tetrafunctional or higher functionality polyfunctionalizing agents. Functionality may also be influenced by factors such as stoichiometry.

Thiol-terminated polythioether prepolymers having a functionality greater than 2.0 may be prepared in a manner similar to the difunctional thiol-terminated polythioether prepolymers described in U.S. Application Publication No. 2010/0010133. For example, thiol terminated polythioether prepolymers may be prepared by combining (i) one or more dithiols described herein, with (ii) one or more divinyl ethers described herein, and (iii) one or more polyfunctionalizing agents such as any of those mentioned above. The mixture may then be reacted, optionally in the presence of a suitable catalyst, to afford a thiol-terminated polythioether prepolymer having a functionality greater than 2.0.

Thiol-terminated polythioether prepolymers provided by the present disclosure represent thiol-terminated polythioether prepolymers having a molecular weight distribution. For example, useful thiol-terminated polythioether prepolymers can be characterized by a number average molecular weight ranging from 500 Daltons to 20,000 Daltons, from 2,000 Daltons to 5,000 Daltons, or from 3,000 Daltons to 4,000 Daltons. Useful thiol terminated polythioether prepolymers can exhibit a polydispersity ($M_w/M_n$; weight average molecular weight/number average molecular weight) ranging, for example, from 1 to 20, or from 1 to 5. The molecular weight distribution of thiol-terminated polythioether prepolymers may be characterized by gel permeation chromatography.

As mentioned above, also thiol terminated polysulfides can be used as polythiol (b) in curable compositions according to the present invention. Herein, "polysulfides" may refer to prepolymers that contain one or more sulfide linkages, i.e., —$S_x$— linkages, where x is from 2 to 4, in the polymer backbone and/or in pendant positions on the prepolymer chain. A polysulfide prepolymer can have two or more sulfur-sulfur linkages. Suitable thiol-terminated polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. Examples of suitable thiol-terminated polysulfides are disclosed, for example, in U.S. Pat. No. 4,623,711.

Thiol-terminated sulfur-containing polyformal prepolymers, which can be used as polythiol (b) in curable compositions according to the present invention e.g. for aerospace sealant applications are disclosed, for example, in U.S. Application Publication No. 2012/0234205 and in U.S. Application Publication No. 2012/0238707, each of which is incorporated by reference in its entirety.

Thiol-terminated sulfur-containing prepolymers useful as polythiol in the curable compositions according to the present invention can comprise a metal ligand-containing thiol-terminated sulfur-containing prepolymer in which a metal ligand is incorporated into the backbone of the prepolymer. Metal ligand-containing sulfur-containing prepolymers are disclosed in U.S. Application Publication Nos. 2014/0276474, 2014/0378650, and 2014/0378649, each of which is incorporated by reference in its entirety.

The polythiol (b) is typically present in the curable composition of the present invention in an amount of 10 to 90 percent by weight, based on the total weight of components (a) and (b) in the curable composition. For example, the polythiol (b) may be present in the curable composition in an amount of at least 10 percent by weight, often at least 30 percent by weight, or at least 50 percent by weight, or even at least 60 percent by weight, based on the total weight of components (a) and (b) in the curable composition, as demonstrated in the examples below. Moreover, the polythiol (b) may be present in the curable composition in an amount up to 75 percent by weight, often up to 60 percent by weight, based on the total weight of components (a) and (b) in the curable composition. Typically, the equivalent ratio of thiol functional groups in the polythiol (b) to ethylenically unsaturated groups in the polyene (a) is 0.1 to 10:1, such as 0.4 to 1.6:1.

Curable compositions of the present invention further comprise (c) any of the catalytic compositions described herein. The reactive compound (c)(i) is typically present in the curable composition according to the present invention in amounts of 0.001 to 20 percent by weight, such as 0.01 to 10 percent by weight based on the total weight of components (a), (b) and (c)(i) in the curable composition. The metal compound (ii) is typically present in the curable composition according to the present invention in amounts of 1 to 1000 ppm, such as 5 to 175 ppm, based on the weight of the metal element relative to the polythiol (b) in the curable composition. The compound (iii) is typically present in the curable composition according to the present invention in amounts of 0.001 to 10 percent by weight, such as 0.01 to 5 percent by weight based on the total weight of components (a) and (b) in the curable composition. Often the mole ratio of reactive compound (i) to compound (iii) is within the range of 0.1 to 10:1, such as 1 to 5:1.

When preparing the curable composition according to the present invention, all three components of the catalytic composition (c) may be added as a single package to one or more of the remaining components of the curable composition (i.e., added to (a) and/or (b)). Alternatively, one or more of each component of the catalytic composition (c) may be added in separate packages to one or more components of the curable composition. For example, the metal compound (ii) is often soluble in one or more components of the curable composition, and may be added thereto upon formulation of the curable composition. Components (i) and (iii) of the catalytic composition may then be added separately, either individually or together. It is also possible to incorporate the metal compound (ii) into the curable composition by grinding it with one or more components of the curable composition.

Optional ingredients, such as dyes, pigments, tints, plasticizers, anti-oxidants, thixotropic agents, reactive diluents, hindered amine light stabilizers, UV light absorbers and stabilizers may be formulated into the curable compositions of the present invention. These ingredients may be present (on an individual basis) in amounts up to 30 percent by weight, often from 0.1 to 5 percent by weight, based on the total weight of components (a) and (b) in the curable composition.

Examples of suitable pigments and/or pigment compositions include carbazole dioxazine crude pigment, azo, monoazo, disazo, naphthol AS, salt type (lakes), benzimidazolone, condensation, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrole pyrrole red ("DPPBO red"), carbon black, and mixtures thereof. The terms "pigment" and "colored filler" can be used interchangeably.

Example dyes include those that are solvent and/or aqueous based such as add dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

When present, a pigment is typically used in the curable composition according to the present invention in amounts of up to 80, such as 1 to 80 percent by weight based on total solids weight of the composition.

The curable compositions of the present invention typically contain a diluent to dissolve and/or disperse the various ingredients in the composition. Examples of suitable diluents include, but are not limited to organic materials including aromatic materials such as toluene and xylene, esters such as butyl acetate and amyl acetate, ethers such as dialkyl ethers of ethylene and propylene glycol, and ketones such as methyl ethyl ketone and methyl amyl ketone. Other suitable diluents include water and water miscible solvents such as alcoholic solvents and ethers.

The curable compositions according to the present invention may be formulated to a solids content of 1 to 100 percent by weight, such as 20 to 80 percent by weight, based on the total weight of the composition.

The ingredients of the composition are typically mixed with one another with low shear mixing to form the curable composition. When pigments are present, they are usually ground with high shear mixing in one of the resinous ingredients of the composition such as the polyene (a), polythiol (b) or reactive compound (i) to form a pigment paste that then is incorporated into the composition with low shear mixing.

The curable compositions are useful as sealants or as protective or decorative coating compositions and may be used as primer coats or topcoats including color coats and clear coats. The compositions are curable at low temperatures such as −10 to 80° C., and find particular utility in the refinish of automobiles and trucks.

The curable compositions of the present invention may be applied over any of a variety of substrates such as metallic, glass, wood, and/or polymeric substrates, and can be applied by conventional methods including, but not limited to, brushing, dipping, flow coating, spraying and the like. The substrates may be bare, pretreated, or coated with a primer and/or sealer. The curable compositions are most often applied to the substrate by spraying. The usual spray techniques and equipment for air spraying, airless spraying, and electrostatic spraying employing manual and/or automatic methods can be used. Suitable substrates include metal substrates such as ferrous metals, zinc, copper, magnesium, aluminum, aluminum alloys, and other metal and alloy substrates such as those typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as Galvanneal, and combinations thereof. Combinations or composites of ferrous and non-ferrous metals can also be used.

The curable compositions of the present invention may also be applied over elastomeric, plastic, or composite substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. By "composite" is meant any substrate consisting of fibers, typically of glass or carbon, or other filler material that is incorporated with polymeric or plastic materials, commonly of epoxy type polymers.

Each of the characteristics and examples described above, and combinations thereof, may be said to be encompassed by the present invention. In view of the foregoing the present invention relates e.g. to the following nonlimiting aspects 1-15:

1. A catalytic composition comprising:
(i) a reactive compound comprising at least one group selected from acid-functional groups and/or groups that may be converted to acid-functional groups;
(ii) a metal compound; and
(iii) a compound different from (i) and (ii) that catalyzes an addition reaction between an ethylenically unsaturated compound and a thiol.

2. The catalytic composition according to aspect 1, wherein the reactive compound (i) comprises an anhydride-containing polymer, usually an anhydride-containing (meth) acrylic polymer.

3. The catalytic composition according to any one of aspect 1 and aspect 2, wherein the metal compound (ii) comprises at least one of a metal oxide, a metal salt, and an organometallic compound, wherein the metal compound (ii) usually comprises an iron compound.

4. The catalytic composition according to any one of the preceding aspects 1-3, wherein the compound (iii) comprises an amine, phosphine or a mixture thereof, the compound (iii) often being selected from one or more of oxazolidines, triethylamine, dimethylcyclohexylamine, dimethyloctylamine, dimethyldodecylamine, dimethylamino ethanol, tetramethyl guanidine, diaza-bicyclo-octane, diaza-bicyclo-undecene, diaza-bicyclo-nonene, n-methyl-triaza-bicyclodecene, trioctyl phosphine and triphenyl phosphine.

5. The catalytic composition according to any one of the preceding aspects 1-4, wherein the metal compound (ii)

comprises an iron compound, the compound (iii) comprises a secondary or tertiary amine, and the molar ratio of amine to iron is 0.4 to 500:1.

6. A curable composition comprising:
   (a) a polyene,
   (b) a polythiol, and
   (c) the catalytic composition according to any one of the preceding aspects 1-5.

7. The curable composition according to aspect 6, wherein the polyene has the structural formula $$A\text{-}(X)_m$$

where A is an organic moiety: X is an olefinically unsaturated moiety and m is at least 2, wherein the polyene $A\text{-}(X)_m$ usually comprises a polyurethane (meth)acrylate or polyester (meth)acrylate.

8. The curable composition according to aspect 7, wherein X is selected from $-C(O)CHR=CH_2$, $-CH_2-CHR=CH_2$, and mixtures thereof, where R is hydrogen or methyl.

9. The curable composition according to any one of aspect 7 or aspect 8, wherein A contains groups selected from ester and urethane and/or is derived from a polyisocyanate.

10. The curable composition according to any one of the preceding aspects 6-9, wherein the polythiol has the structural formula $R_1-(SH)_n$ where $R_1$ is an organic moiety and n is at least 2, n usually being from 2 to 6.

11. The curable composition according to aspect 10, wherein $R_1$ contains ester groups and/or is derived from a polyol.

12. The curable composition according to any one of preceding aspects 6-11, wherein the polythiol comprises a reaction product of a thiol-functional organic acid and a polyol.

13. The curable composition according to any one of the preceding aspects 6-12, wherein the reactive compound (c)(i) of the catalytic composition is present in the curable composition in amounts of 0.001 to 20 percent by weight, based on the total weight of components (a) (b) and (c)(i) in the curable composition.

14. The curable composition according to any one of the preceding aspects 6-13, wherein the compound (iii) of the catalytic composition is present in the curable composition in amounts of 0.001 to 10 percent by weight, based on the total weight of components (a) and (b) in the curable composition.

15. The curable composition according to any one of the preceding aspects 6-14, wherein the equivalent ratio of thiol functional groups in the polythiol (b) to ethylenically unsaturated groups in the polyene (a) is 0.1 to 10:1.

The present invention will further be described by reference to the following examples. The examples are merely illustrative of the invention and are not intended to be limiting. Unless otherwise indicated, all parts are by weight.

EXAMPLES 1A TO 1I

Examples 1D, 1F, 1H, and 1I demonstrate compositions according to the present invention. Examples 1A, 1B, 1C, 1E, and 1G are comparative. Example formulations listed in Table 1 were combined and monitored for pot life. Formulation components were either mixed by hand with a spatula or in the case of small volumes that are difficult to mix by hand, the formulations were mixed using a bench top vortex mixer. Pot life is determined by viscosity change over time on a CAP 2000+ Viscometer (Brookfield Engineering) with a #1 cone spindle set at a rotation speed of 900 RPM at a temperature of 25° C. The time it takes for the viscosity to double that of the initial viscosity is reported as pot life. Gel time is the time elapse after combining all ingredients until the composition does not demonstrate a visually observable flow, such as when a vial is inverted and the composition does not flow. Select formulations were also tested for film drying and curing properties. Tack-free time is the amount of time required for a coating to achieve a level of dryness, such that upon the application and removal of a cotton ball, no cotton fibers are transferred to the coating surface. The cotton ball is applied in the following manner:

1. With a panel in a horizontal position, hold a cotton ball approximately 3 inches above and drop.
2. Hold panel paint side up for 5±2 seconds with cotton ball. After 5 seconds, flip panel paint side down.
   a. If cotton ball drops off leaving no fibers on the film, the coating is tack-free.
   b. If the cotton ball does not drop off or leaves fibers, repeat steps 1-2 at appropriate time intervals until coating is tack-free, such as every 15 minutes.

MEK double rubs are reported as the number of double rubs done by hand, with a methyl ethyl ketone soaked rag, required to dissolve the coating such that the substrate is visible. This test was performed 1 hour after tack-free and the maximum number of double rubs recorded is 100.

TABLE 1

| | 1A[10] (Comp. Ex.) | 1B[11] (Comp. Ex.) | 1C[10] (Comp. Ex.) | 1D[11] | 1E[11] (Comp. Ex.) | 1F[11] | 1G[11] (Comp. Ex.) | 1H[11] | 1I[11] |
|---|---|---|---|---|---|---|---|---|---|
| | \multicolumn{9}{c}{Formula by weight (g)} | | | | | | | | |
| SR399LV[1] | 21.00 | 25.00 | 42 | 25.00 | — | — | 9 | 9 | 9 |
| SR350[2] | — | — | — | — | 26.74 | 26.75 | — | — | — |
| Thiocure PETMP[3] | 21.14 | 25.00 | 42.28 | 25.00 | 25.00 | 25.00 | 9 | 9 | 9 |
| BYK-325[4] | 0.12 | 0.15 | 0.24 | 0.15 | 0.15 | 0.15 | 0.05 | 0.05 | 0.05 |
| n-butyl acetate | 17.6 | 18.00 | 35.2 | 19.90 | 18.60 | 20.60 | 6.1 | 5.8 | 5.9 |
| iron solution[5] | — | — | 0.72 | 1.21 | — | 1.21 | — | 0.15 | 0.15 |
| Anhydride resin[6] | — | — | — | 0.32 | — | 0.34 | — | 0.32 | — |
| Propionic acid | — | — | — | — | — | — | — | — | 0.07 |
| Catalyst[7] | — | — | — | 0.21 | — | 0.21 | — | — | — |
| Catalyst[8] | — | 3.34 | — | — | 3.45 | — | — | — | — |
| Catalyst[9] | — | — | — | — | — | — | 1.62 | 1.62 | 1.62 |

TABLE 1-continued

| | Formula by weight (g) | | | | | | | | |
|---|---|---|---|---|---|---|---|---|---|
| | 1A[10] (Comp. Ex.) | 1B[11] (Comp. Ex.) | 1C[10] (Comp. Ex.) | 1D[11] | 1E[11] (Comp. Ex.) | 1F[11] | 1G[11] (Comp. Ex.) | 1H[11] | 1I[11] |
| | Properties | | | | | | | | |
| Pot life (min) | >360 | <15 | 180-240 | >180 | >120 | 75-90 | 15-30 | 60-75 | 30-45 |
| Tack-free time (min) | >360 | <15 | <15 | <15 | >150 | <15 | >360 | <15 | 15-30 |
| MEK Double Rubs | | 100 | 10 | 100 | | 100 | | | |

[1] Penta-functional acrylate (low viscosity dipentaerythritol pentaacrylate) from Sartomer.
[2] Tri-functional methacrylate (trimethylolpropane trimethacrylate) from Sartomer.
[3] Pentaerythritol tetrakis (3-mercaptopropionate) from BRUNO BOCK Chemische Fabrik GmbH & Co. KG.
[4] Flow Additive from BYK USA Inc.
[5] 1 wt % solution of iron(III)chloride hexahydrate in n-butyl acetate.
[6] Example 1 from U.S. Pat. No. 4,798,745, which is incorporated by reference in its entirety.
[7] 5 wt % solution of diaza-bicyclo-octane in n-butyl acetate.
[8] 0.3 wt % solution of diaza-bicyclo-octane in n-butyl acetate.
[9] 1 wt % solution of 2-dimethylaminoethanol in n-butyl acetate.
[10] Order of addition Thiocure ® PETMP, n-butyl acetate, iron solution, catalyst, anhydride resin, SR399LV or SR350, BYK-325. If a component was not present in the formulation this order of addition was maintained with all remaining components.
[11] Order of addition SR399LV or SR350, n-butyl acetate, catalyst, iron solution, anhydride resin, Thiocure ® PETMP, BYK-325. If a component was not present in the formulation this order of addition was maintained with all remaining components.

The compositions of the Example formulations were spray applied with a SATAJet® 4000 B HVLP spray gun with a 1.3 mm nozzle to ACT cold roll steel panels (10.16 cm by 30.48 cm) with an ED6060 electrocoat available from ACT Laboratories, Inc. The compositions were applied in two coats with an ambient flash until visibly dry between coats. A dry film thickness of about 2.0 mils to 3.5 mils (about 50 micrometers to 89 micrometers) was targeted. After the coating was applied, the coating was allowed to cure at ambient conditions (typically 68-74° F. (20-22"C.), 20-70% relative humidity).

It is typically desirable for a curable composition in automotive refinish applications to have a long pot life combined with short tack-free time and good solvent resistance, evidenced by a high number of MEK double rubs. It can be seen from Table 1 that a catalyst can provide short tack-free time and good solvent resistance (MEK double rubs), but at the expense of having a short pot life as shown by Comparative Examples 1A and 1B. Comparative Example 1C demonstrates that the use of iron can give a fast tack-free time with an improved pot life relative to Example 1B, but it does not provide acceptable MEK double rubs. Example 1D is an example of the invention utilizing a catalytic composition comprising an amine catalyst, iron compound, and anhydride. Example 1D demonstrates a long pot life compared to Example 1B with a similar fast tack-free time and good MEK double rubs, which represents a desirable combination of drying and curing properties.

Another advantage of the present invention is demonstrated by contrasting Comparative Example 1E and Example 1F of the present invention. An amine-catalyzed reaction mixture of thiol and methacrylate (Comparative Example 1E) shows little to no reactivity, but when the same thiol and methacrylate are formulated with a catalytic composition comprising an amine catalyst, iron, and anhydride (as in Example 1F), a desirable pot life and drying and curing properties were observed.

Comparative Example 1G shows an amine-catalyzed formulation that exhibited a short pot life and on tack-free time, and an undesirable combination of drying and curing properties. Example 1H, an example of the invention, uses the same amine catalyst as Comparative Example 1G but in combination with iron and anhydride as a catalytic composition, creating a desirable longer pot-life and shorter tack-free time. Similarly, Example 1I of the present invention uses the same amine catalyst as Comparative Example 1G but in combination with iron and acid, yielding a longer pot life and shorter tack-free time than Example 1H. Although the drying and curing properties of Example 1I are not as desirable as those of Example 1H, they are noticeably improved as compared to Comparative Example 1G.

Whereas particular examples of this invention have been described above for purposes of illustration, it will be evident to those skilled in the art that numerous variations of the details of the present invention may be made without departing from the invention as defined in the appended claims.

What is claimed is:

1. A catalytic composition comprising:
   (i) a reactive compound comprising at least one group selected from acid-functional groups and/or groups that are convertible to acid-functional groups;
   (ii) a metal compound; and
   (iii) a compound different from (i) and (ii) that catalyzes an addition reaction between an ethylenically unsaturated compound and a thiol.

2. The curable composition of claim 1 wherein the reactive compound (i) comprises an anhydride-containing polymer.

3. The curable composition of claim 1 wherein the metal compound (ii) comprises at least one of a metal oxide, a metal salt, and an organometallic compound.

4. The curable composition of claim 1 wherein the compound (iii) is selected from one or more of oxazolidines, triethylamine, dimethylcyclohexylamine, dimethyloctylamine, dimethyldodecylamine, dimethylamino ethanol, tetramethyl guanidine, diaza-bicyclo-octane, diaza-bicyclo-undecene, diaza-bicyclo-nonene, n-methyl-triaza-bicyclodecene, trioctyl phosphine and triphenyl phosphine.

5. A curable composition comprising:
(a) a polyene,
(b) a polythiol, and
(c) the catalytic composition of claim 1.

6. The curable composition of claim 5 wherein the polyene has the structural formula

where A is an organic moiety; X is an olefinically unsaturated moiety and m is at least 2.

7. The curable composition of claim 6 wherein X is selected from —C(O)CHR=CH$_2$, —CH$_2$—CHR=CH$_2$ and mixtures thereof, where R is hydrogen or methyl.

8. The curable composition of claim 6 wherein A contains groups selected from ester and urethane.

9. The curable composition of claim 6 wherein A is derived from a polyisocyanate.

10. The curable composition of claim 6 wherein A-(X)$_m$ comprises a polyurethane (meth)acrylate or polyester (meth)acrylate.

11. The curable composition of claim 5 wherein the polythiol has the structural formula R$_1$—(SH)$_n$ where R$_1$ is an organic moiety and n is at least 2.

12. The curable composition of claim 11 wherein R$_1$ contains ester groups.

13. The curable composition of claim 11 wherein R$_1$ is derived from a polyol.

14. The curable composition of claim 11 wherein the polythiol comprises a reaction product of a thiol-functional organic acid and a polyol.

15. The curable composition of claim 11 wherein n is from 2 to 6.

16. The curable composition of claim 5 wherein the reactive compound (i) comprises an anhydride-containing polymer.

17. The curable composition of claim 16 wherein the anhydride-containing polymer comprises a (meth)acrylic polymer.

18. The curable composition of claim 5 wherein the reactive compound (i) is present in the curable composition in amounts of 0.001 to 20 percent by weight, based on the total weight of components (a), (b) and the reactive compound (i) in the curable composition.

19. The curable composition of claim 5 wherein the metal compound (ii) comprises at least one of a metal oxide, a metal salt, and an organometallic compound.

20. The curable composition of claim 19 wherein the metal compound (ii) comprises an iron compound.

21. The curable composition of claim 5 wherein the compound (iii) is selected from one or more of oxazolidines, triethylamine, dimethylcyclohexylamine, dimethyloctylamine, dimethyldodecylamine, dimethylamino ethanol, tetramethyl guanidine, diaza-bicyclo-octane, diaza-bicyclo-undecene, diaza-bicyclo-nonene, n-methyl-triaza-bicyclodecene, trioctyl phosphine and triphenyl phosphine.

22. The curable composition of claim 21 wherein the compound (iii) is present in the curable composition in amounts of 0.001 to 10 percent by weight, based on the total weight of components (a) and (b) in the curable composition.

23. The curable composition of claim 5, wherein the metal compound (ii) comprises an iron compound, the compound (iii) comprises a secondary or tertiary amine, and the molar ratio of amine to iron is 0.4 to 500:1.

24. The curable composition of claim 5 wherein the equivalent ratio of thiol functional groups in the polythiol (b) to ethylenically unsaturated groups in the polyene (a) is 0.1 to 10:1.

* * * * *